(12) United States Patent
Wegener et al.

(10) Patent No.: US 8,376,433 B2
(45) Date of Patent: Feb. 19, 2013

(54) GRAB APPARATUS FOR HANDLING BINS OR CASES

(75) Inventors: Kai Wegener, Munich (DE); Peter Kirschner, Soechtenau (DE); Alexander Baier, Rosenheim (DE)

(73) Assignee: Krones AG, Neutraubling (DE)

( * ) Notice: Subject to any disclaimer, the term of this patent is extended or adjusted under 35 U.S.C. 154(b) by 226 days.

(21) Appl. No.: 12/815,806

(22) Filed: Jun. 15, 2010

(65) Prior Publication Data

US 2011/0037283 A1  Feb. 17, 2011

(30) Foreign Application Priority Data

Aug. 11, 2009  (DE) .......................... 10 2009 026 361

(51) Int. Cl.
*B25J 15/10* (2006.01)
(52) U.S. Cl. ...................... 294/67.31; 294/106; 294/902
(58) Field of Classification Search ............... 294/81.51, 294/81.61, 67.31, 87.1, 87.22, 106, 902
See application file for complete search history.

(56) References Cited

U.S. PATENT DOCUMENTS

| 2,879,102 | A | * | 3/1959 | Kughler ........................ 294/106 |
| 3,250,229 | A | * | 5/1966 | Keller ............................ 104/7.1 |
| 4,632,444 | A | * | 12/1986 | Martinez et al. ............. 294/86.4 |
| 5,253,912 | A | * | 10/1993 | Andorlini et al. .......... 294/119.1 |
| 6,412,844 | B1 | * | 7/2002 | Hendzel ..................... 294/67.31 |
| 6,508,497 | B1 | | 1/2003 | Nerger |
| 2005/0249133 | A1 | | 11/2005 | Terry et al. |

FOREIGN PATENT DOCUMENTS

| DE | 2253185 |  | 5/1974 |
| DE | 3024192 | A1 | 3/1981 |

* cited by examiner

*Primary Examiner* — Dean Kramer
(74) *Attorney, Agent, or Firm* — Andrew Wilford

(57) ABSTRACT

An apparatus for grabbing and lifting a case having side walls each formed with a hole has a plurality of grabs each having a plurality of pivotal lift arms each having a lower end provided with a horizontally projecting finger engageable into one of the holes. The fingers of each grab are vertically offset from one another.

14 Claims, 5 Drawing Sheets

GRAB APPARATUS FOR HANDLING BINS OR CASES

FIELD OF THE INVENTION

The present invention relates to an apparatus or grab for handling bins or cases. More particularly this invention concerns an apparatus for simultaneously grabbing and lifting a plurality of bins or cartons having side holes.

BACKGROUND OF THE INVENTION

In industrial filling plants, beverages are packaged in containers or bottles that are moved from one treatment area to another. Then they are typically loaded as groups into upwardly open bins or cases that are of parallepipedal shape and have vertical side walls formed with throughgoing holes. Typical a dozen bottles are held in a single such case, which itself is made of one piece of injection-molded plastic.

When machines handle such beverage cases, so-called hook grab systems are used by means of which at least one beverage case may be picked up by at least two or more hook grabs that are pivoted from above into the side holes so that the case can be lifted. Depending on the case size and the pack formation and/or the layer pattern of the cases, the hooks are arrayed in groups. In conventional hook grab systems, these hook groups are mounted on a common pivotal shaft that is centrally driven by a common drive and may thus carry out the desired pivoting movements.

DE 27 35 791 discloses a grab apparatus for lifting a plurality of bottle cases that are directly adjacent one other but not connected together. The grab apparatus comprises several pivotal hooks that engage through openings in side walls of the cases. The four walls of the bottle cases are associated with respective hooks, and all the hooks for an aligned row of case side walls are carried on a common pivot shaft. Two groups of parallel pivot shafts extending at a right angle to each other are positioned in two horizontal planes situated one above the other. The two groups of pivot shafts arranged one above the other are supported by each other at least where they cross. Every two adjacent, aligned pivot shafts has a common rotary drive.

DE 30 24 192 A1 further discloses a grab apparatus for loading and depalletizing piece goods, such as bottle cases, in planar layers from above. The apparatus has a central drive and adjustable force transmission elements.

In this context, various types of grab apparatuses are known for engaging cases, for example spring-loaded single hooks or grabs that are inserted from above along two walls of adjacent cases and that are then closed so that the tight engagement of the cases is based on friction. For example, EP 1 020 395 B1 discloses a clamp-type gripper for loads to be gripped from above. This document describes a grab capable of gripping a load without having to engage underneath it. When the support is raised with the gripping elements engaging the load, the grip automatically bears on the case(s) with a clamping force dependent on the weight of the load by the gripping elements moving in the load direction relative to the support elements. This device is only usable due to the establishment of a frictional grip.

DE 20 2005 007 347 U1 discloses a robot for engaging and transporting a container provided with a connector that itself has a horizontal support that may establish a connection with a robot. In this device, at least one vertical support arm is pivotally connected to the support element, and there is a connecting element adapted to the container at the end of the support arm facing away from the support element. By pivoting the support arm, the container may be connected to or disconnected from the connecting element. However, this device can only work with containers of the same size.

DE 22 53 185 A describes a grab apparatus for simultaneously engaging several bottle cases that are open at the top and provided with side holes for manual gripping. The device for engaging the cases may be controlled with respect to height and side position and is provided with grab arms in the form of hooks that may be pivoted into the recesses or holes for manual gripping and operated by means of hydraulic cylinders. The grab arms are positioned on push and/or pull rods that may be designed to be adjustable in several directions in one plane.

The known grab apparatuses require a defined shape of the objects to be gripped and additionally have to be guided and controlled in a precise way in order to be capable of reliable and safe gripping of the objects.

OBJECTS OF THE INVENTION

It is therefore an object of the present invention to provide an improved grab apparatus for handling bins or cases.

Another object is the provision of an improved apparatus for simultaneously grabbing bins or cases that overcomes the above-given disadvantages, in particular that is fail-safe and is designed for use with different types of cases due to a suitable design in order to be able to grip and/or engage cases individually and/or by layered groups.

SUMMARY OF THE INVENTION

An apparatus for grabbing and lifting a case having side walls each formed with a hole has according to the invention a plurality of grabs each having a plurality of pivotal lift arms each having a lower end provided with a horizontally projecting finger engageable into one of the holes. The fingers of each grab are vertically offset from one another. The bins or cases may have varied designs and shapes and are open at the top, and each normally hold a plurality of containers or bottles. In addition, the packs or cases each have side holes.

According to the present invention, a grab may include at least two grab arms so that various types and/or sizes of cases may, for example, be palletized to form pack layers. Furthermore, the grabs and the grab arms may by arranged to be is movable so that the fingers of the grab arms may be better inserted or pivoted into the case holes and are also movable.

The grab arms are L-shaped and have hook-like fingers at their lower ends, all projecting in the same direction. This allows lifting and safe palletizing of different cases and/or packs within one formation. The formation may, for example, be a row or layer. As the grab arms of each grab are arranged at different heights, the grab apparatus is relatively tolerant with respect to differing case heights and/or sizes, dimensions and/or heights of their side holes. Different cases with holes at different heights may easily be handled with the help of the grab arms engaging at different heights.

The grab arms of the grabs are mounted in a support and may pivot or otherwise move independently of one another. In addition, all the grab arms of each grab are pivotal at a common rotation axis in the respective support. The independent mounting allows the engagement of different case holes, the matching grab arm engaging the hole while the one or more other grab arms do not have to be engaged and, due to their pivotal mounting, may make way and/or may be pushed back by the closed areas of the pack or case walls.

In order to need as little space as possible in the grab apparatus, at least some of the grab arms have cutouts. This allows arranging the grab arms in an offset way one on top of the other, with the cutout of one grab arm forms a space in which a second grab arm can move. In such an arrangement, at least the fingers of two grab arms are aligned in one plane one above the other and/or may pivot in a common or nearly identical plane of movement. In this alternative, the grab arms are approximately C-shaped and of different sizes so that the two fingers can lie in the same plane one within the other but at a spacing. If there is a third grab arm, it may be arranged in a pivot plane parallel thereto and with its lift finger at a height different from that of the other grab arms.

The grab arms are of different lengths and approximately parallel to each other. In this way, the grab arms may quite easily be made of suitable sheet metal material, such as stainless steel or light metal sheets, by punching and/or bending. It is also possible to make them of fiber-reinforced plastic with stiffening ribs.

In order to ensure independent operation of each grab arm, they are each provided with a spring whose force resists a pushing back of the movably mounted grab arms from an outer rest position when they hit a side or case wall of a case to be gripped. A grab arm engaging the case hole is pivoted into its rest position by the force of the spring, while the one or more other grab arms that are pushed back have more prestress. In this embodiment, the only grab arm needed for operation is the one that has the necessary length to fit into the hole of the cases and to grip and/or engage the case at the handle ledge or bearing surface. The grab arms contacting the case wall are slightly pivoted backward around the rotation axis against the spring force.

The force of the spring may, if necessary, be adjustable for each grab arm. This may be advantageous if the grab arms with their different lengths and thus with different leverage factors need to have approximately the same biasing force, that is press with the same force against the case.

The fingers of the grab arms each have an upwardly turned support face that may grip and thus lift the cases in their holes. For secure guidance of the cases during their palletization, the support faces may preferably be corrugated and/or coated and/or be provided with nonslip material. Furthermore, so-called brace arms may serve as counter-elements for the spring-loaded grab arms. The brace arms are arranged at the opposite side of the case wall and directly opposite to the spring-loaded grab arms so that they act as a support if, for example, the case walls yield, so that deformation of the case wall is prevented.

The grab apparatus may include several grabs mounted around a rotation axis by means of a shaft in the support. This shaft is controlled by a drive. When actuated, the shaft is rotated by a small pivot angle so that the grabs move toward the cases. This movement allows the grab arms of the respective grabs to engage the holes of the cases. Depending on design and shape of the cases, at least one grab arm of each grab fits into the corresponding hole of the respective case so that the active grab arm may lift and/or grip the case at the actual handle ledge and/or bearing surface. The other grab arms that, for geometric reasons, cannot engaging or gripping the cases either move into the empty space of the hole below the active finger or hit an upper or lower portion of the case wall above or below the hole. This engagement and the resulting pushing-back of the grab arm are enabled by the force of the spring.

The number of grabs of a grab apparatus may vary. For example, three or even four grabs may be used for lifting two cases. The arrangement and/or assembly of a grab apparatus thus depends on the number of grabs. Among other things, the number of grabs also depends on the formation of the cases.

In order to allow lifting the cases by means of the grabs, the grab arms of a grab may engage the hole of the cases from the outside or from the inside. If, for example, two cases are lifted by three grabs, the fingers of the grab arms of at least two grabs may face in the same direction, i.e. the grab arms of the outer applied grabs may engage the cases from the outside inward or from the inside outward. The third grab arranged in the middle engages both cases on the inside and lifts them both.

It is also possible that the fingers of the grab arms of each grab face in the same direction.

A further alternative consists in that pairs of the fingers of the grab arms of two grabs face each other. In this case, the grab arms of the grabs pivot from the outside inward into the holes of the case or hit the case wall. It is also possible that pairs of the fingers of the grab arms of two grabs face away from each other so that the grab arms engage the holes of the case from the inside outward or hit the case wall.

The grab apparatus includes at least two grabs each having at least two grab arms. As mentioned above, these grabs are arranged to be opposite to each other or opposite and offset with respect to each other so that they may, for example, grip one or more cases. Preferably, the fingers of the grab arms of each grab face in one direction. The inventive device may be a grab having three or more such grab arms. However, each grab should include at least two grab arms.

The invention does not only relate to a grab apparatus having two or more grabs according to one of the above embodiments, but also to a grab of such a grab apparatus having at least two pivotal or otherwise movable grab arms with fingers. According to the invention, the fingers of the separately movable or pivotal grab arms are arranged at different heights to be able to engage, for example, holes of different sizes of cases or packs to be gripped.

In the following, embodiments will explain the invention and its advantages in greater detail with reference to the accompanying drawings. The proportions of the elements with respect to each other, as they are shown in the drawings, do not necessarily correspond to the real proportions, because some elements have been simplified and some elements magnified as compared to other elements for better understanding.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
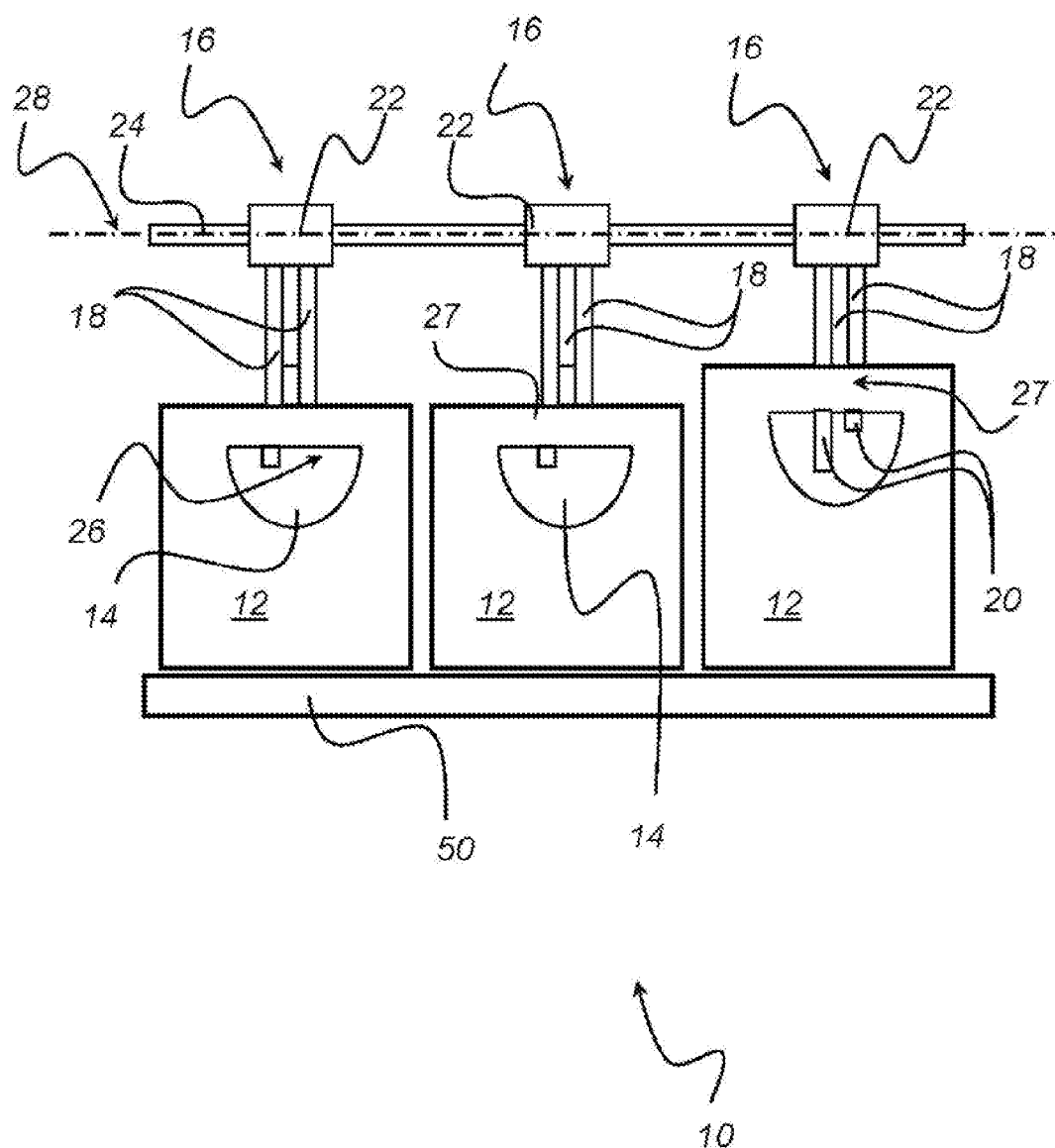
FIG. 1 is a small-scale side view of the structure of a portion of a grab apparatus for engaging or gripping cases.

As seen in FIG. 1 a grab apparatus 10 serves for engaging or gripping cases 12 that may contain beverage containers or bottles (not shown here). The cases 12 are open at the top and have side holes 14. FIG. 1 also shows several cases 12 of different sizes, which are standing in a regular arrangement on, for example, a pallet 50 or a similar support. Each case 12 normally holds a plurality of containers or bottles.

Figure 2:
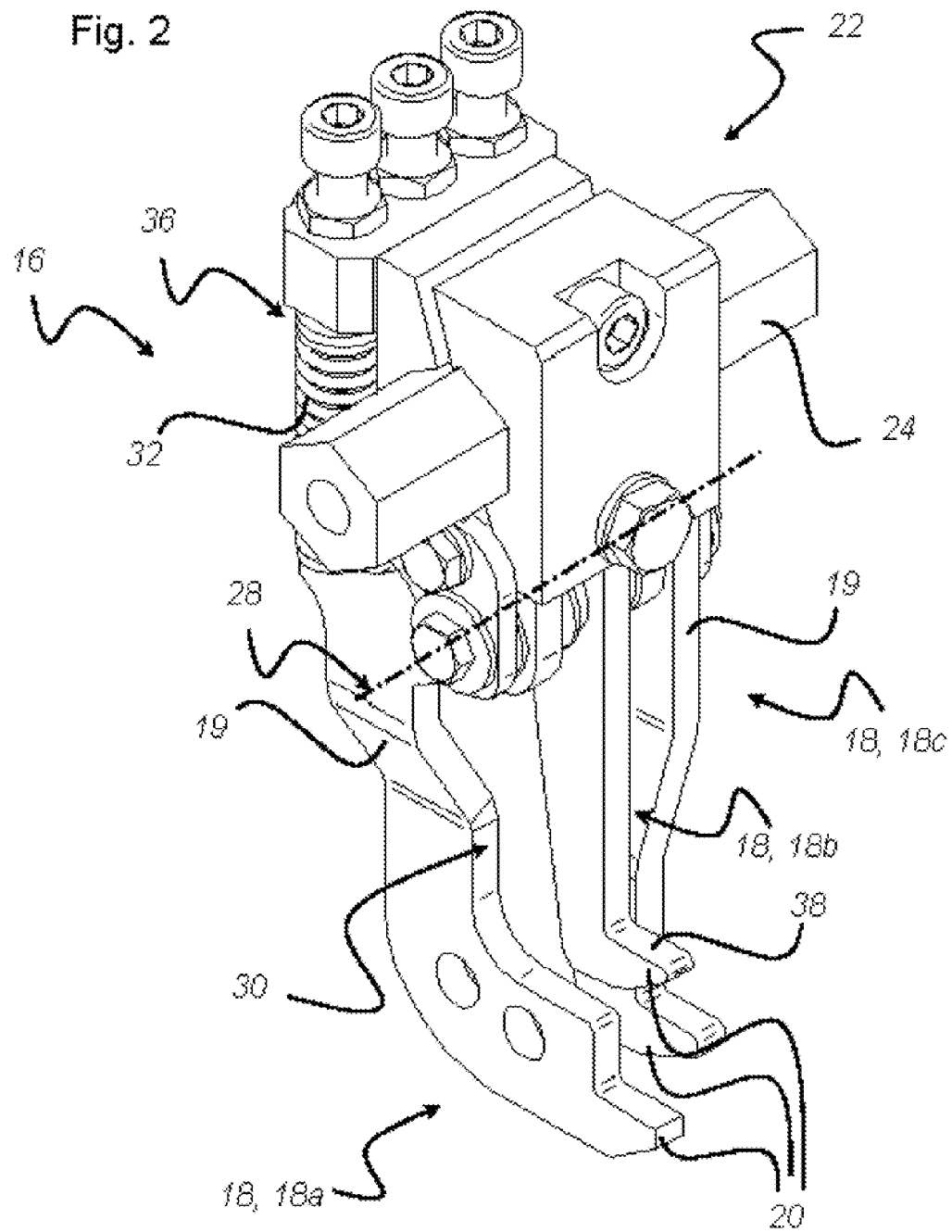
FIG. 2 is a schematic perspective view of the structure of a grab of the apparatus.

The grab apparatus 10 comprises a plurality of pivotal grabs 16 each provided with at least two grab arms 18 pivotal into the side holes 14 of the cases 12 an each having at a lower end a finger 20 (see FIG. 2). In the embodiment shown, each grab 16 comprises three grab arms 18 having respective fingers 20 set at different heights. Hence the grab apparatus 10 is quite tolerant with respect to different case heights and/or sizes, dimensions and/or heights of their side holes 14, that is different cases 12 having holes 14 at different heights may be easily handled with the help of the grab arms 18 engaging at different heights.

The grab arms 18 of each grab 16 are each carried by a respective support 22 and may pivot independently of each other. Thus, each grab arm 18 can pivot about a common rotation axis 28 in the respective support 22 as shown in detail in FIGS. 2 and 3. This independent pivoting makes possible engaging different case holes 14, with at least one of the arms 18 engaging in the hole 14 while one or more of the other grab arms 18 do not have to be engaged and, due to their pivotal mounting, may be pushed out of the way by the closed areas of the case walls 27 surrounding the holes 14.

The grab apparatus 10 includes at least two such arrangements as shown in FIG. 1. Thus the grab apparatus 10 is includes a several grabs 16 mounted on a common shaft 24 with their supports 22. The shaft 24 is controlled and moved with the help of a drive (29 in FIG. 5a). When controlled, the shaft 24 is rotated through a small pivot angle sufficient to move the fingers 20 of the grabs 16 toward the cases 12 as soon as they are supposed to be lifted. Due to the approaching movement, the fingers 20 of the respective grabs 16 engage the holes 14 of the cases 12. Depending on the design and shape of the cases 12, a finger 20 of a grab arm 18 of each of the respective grabs 16 moves below an upper bearing surface 26 in the hole 14 of the cases 12. The other grab arms 18, which, due to geometric reasons, are not used in this lift for engaging the cases 12 at the surfaces 26, either move into empty space, i.e. into the hole 14 of the cases 12 below the engaging arm 18 or they engage any place of the case wall 27 above and/or below the hole 14. This engagement and the resulting pushing back of any of the grab arms 18 is enabled by a below-described spring-loaded mounting. The lifting and gripping of the case 12 is achieved by raising the grab 16 until the grab arm 18 contacts the bearing surface 26 of the case 12.

As mentioned above, the grab apparatus 10 includes at least two grabs 16 each having at least two grab arms 18. These grabs 16 are opposite to each other so that they may grip a case 12 from both sides. For this purpose, the fingers 20 of each grab 16 are opposite one another, and the fingers 20 all face toward the case center when the two grabs 16 cooperate. As can be seen in FIG. 1, the grab apparatus 10 comprises three or more grabs 16 mounted on a common shaft 24, and only one of the opposing pairs of grabs 16 is shown. However, there may also be four, five or more such pairs.

Figure 3:
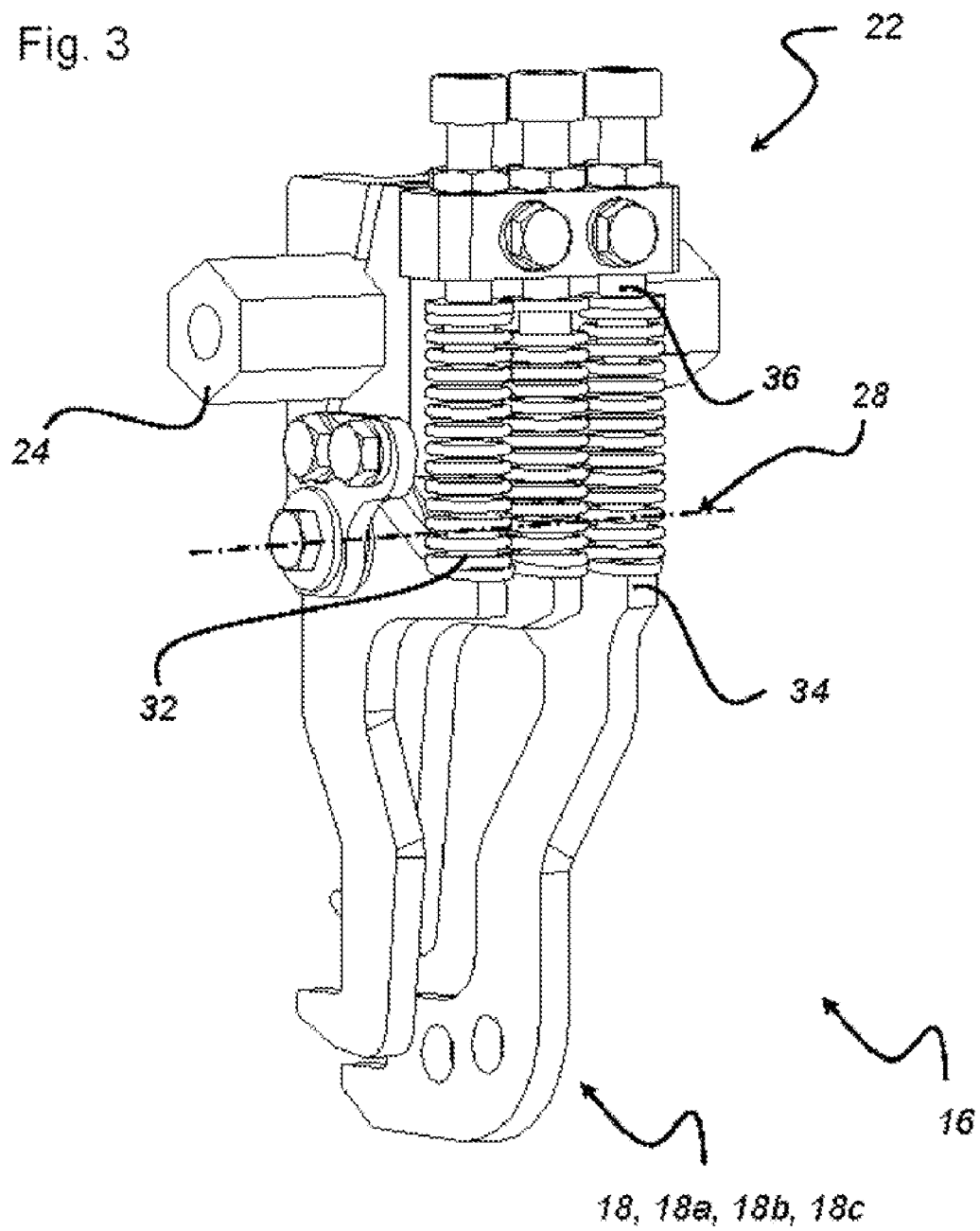
FIG. 3 is a further schematic perspective view of the grab of FIG. 2.

The schematic perspective views of FIGS. 2 and 3 show the structure of a grab 16 of the grab apparatus 10 of FIG. 1. The grab 16 shown comprises a total of three grab arms 18 that are all mounted in the support 22 and may be pivoted independently of each other. The support 22 is fixed by screws to the hexagonal shaft 24. The grab arms 18 are mounted to be all pivotal about the common rotation axis 28 in the respective support 22. In order to be able to mount the grab arms 18 closely adjacent to each other to save space, a first grab arm 18a is C-shaped with a cutout 30 forming a space in which a second grab arm 18b can move. In this arrangement, the two grab arms 18a and 18b are approximately aligned in one vertical plane and may be pivoted in this common or nearly identical plane of movement. A third grab arm 18c is arranged next to the two other grab arms 18a and 18b and may be pivoted in a plane of movement parallel thereto. The result is a compact clustering of the three arms 18.

The illustrations in FIGS. 1 and 2 show that the grab arms 18a, 18b and 18c each have bodies 19 of different lengths so that their lift fingers 20 are at different heights. The bodies 19 of the grab arms 18 may be straight or angled as shown in FIGS. 2 and 3, and are arranged to be approximately parallel to each other. The first grab arm 18a and the third grab arm 18c are each angled, whereas the second or middle grab arm 18b is straight so that the fingers 20 are very close to each other. This design allows relatively easy production of the grab arms 18 using a suitable sheet metal material by means of stamping and/or bending.

In order to ensure independent movement and activation of each grab arm 18, the arms 18 of each grab 16 are each provided with a respective return spring 32 whose force resists a pushing-back movement of the movably mounted grab arms 18 when they hit a side case wall 27 of a case 12 to be gripped and lifted. A grab arm 18 engaging the case hole 14 is continues to be held in its rest position by the force of the spring 32, while the one or more other grab arms 18 are shifted into pushed-back positions with more prestress. In this embodiment, the only grab arm 18 activated is the one that has a body 19 of such a length to allow its finger 20 to engage into the hole 14 of the case 12. A grab arm 18 contacting a case wall 27 is slightly pivoted backward around the rotation axis 28 against the force of the respective spring 32.

In order to support and fix the return springs 32, the grab arms 18 each have rearwardly projecting shoulders 34 as shown in FIG. 3. The lower ends of the springs 32 bear on these shoulders 34, while their upper ends are supported in adjustable spring bearings 36 that are fixed in the support 22 by means of force-adjustment screws. In this way, the restoring forces of the springs 32 are adjustable for each grab arm 18. This may, for example, make the grab arms 18 that would normally bear because of their different lengths with different forces on the case 12 to actually bear thereon with approximately the same force.

The hooks 20 of the grab arms 18 each comprise a support face 38 engaging the cases 12 in their holes 14. For secure guidance of the cases 12 during palletization, the support faces 38 may, for example, be corrugated, toothed and/or coated and/or provided with an nonslip material.

Figure 4:
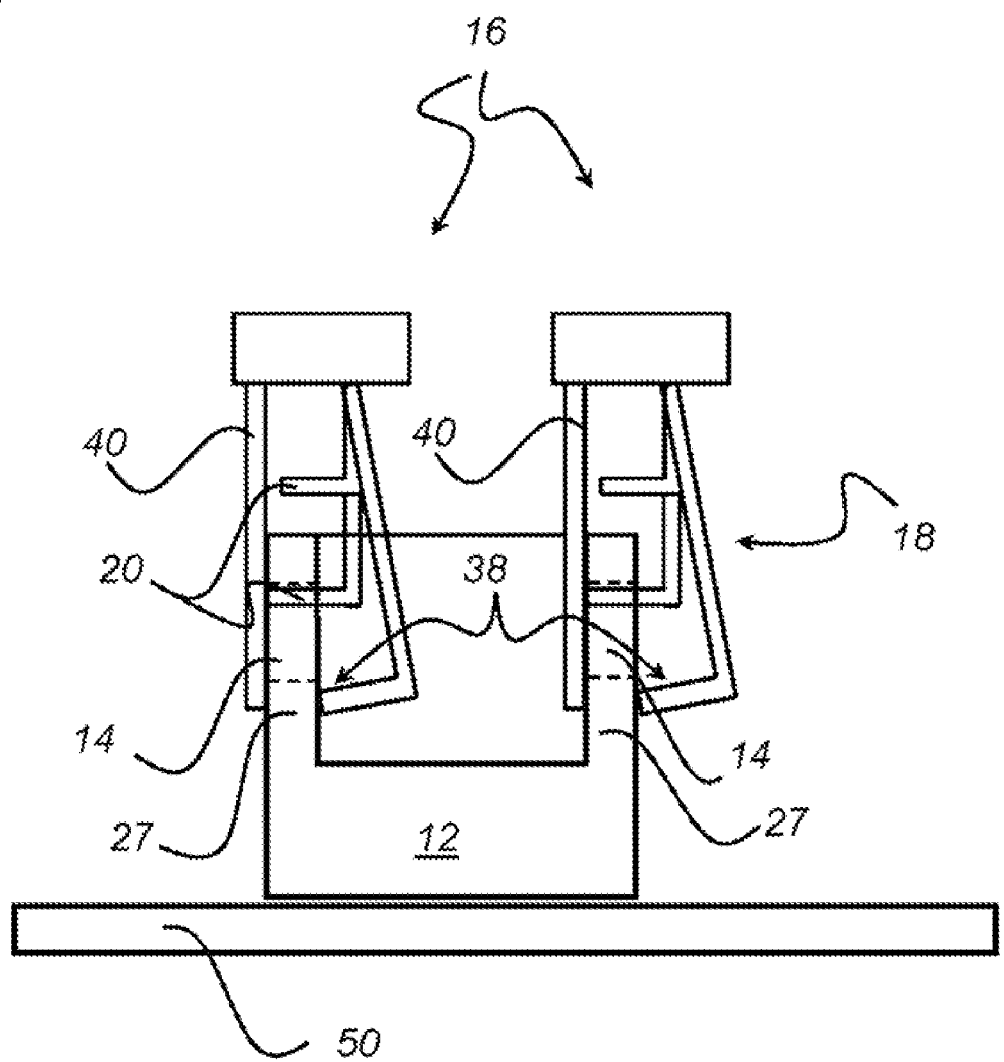
FIG. 4 is a schematic cross-section of a case engaged by two grabs.

FIG. 4 shows a schematic cross-section of a case 12 which is, for example, sitting on a pallet 50 and engaged or gripped by two grabs 16. The fingers 20 of the grab arms 18 each comprise a support face 38 engaging the case 12 in its holes 14 and lifting it off the support 50. Furthermore, so-called brace arms 40 may serve as counter-elements for the spring-loaded grab arms 18 (see FIGS. 2 and 3). The brace arms 40 are on the opposite side of the case wall 27 and directly opposite to the spring-loaded grab arms 18 so that they act as support if, for example, the case walls 27 yield, so that deformation of the case wall 27 is prevented.

Figure 5A:
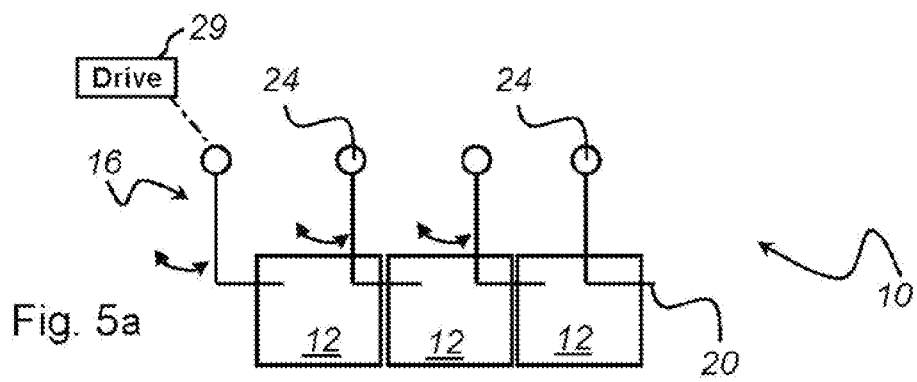
FIGS. 5a to 5e show various arrangements of grabs in the apparatus.
Figure 5B:
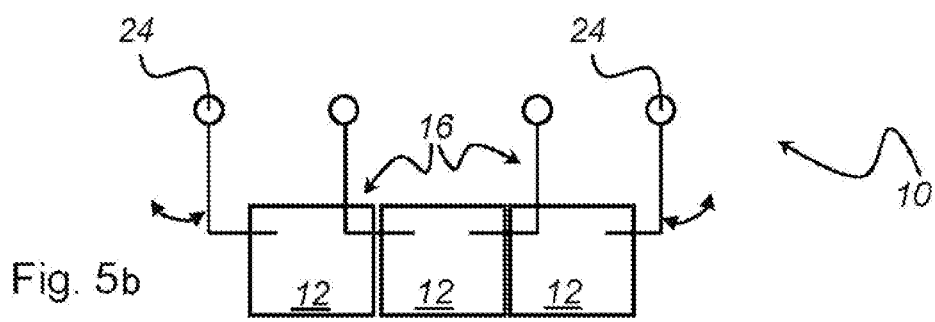
Figure 5C:
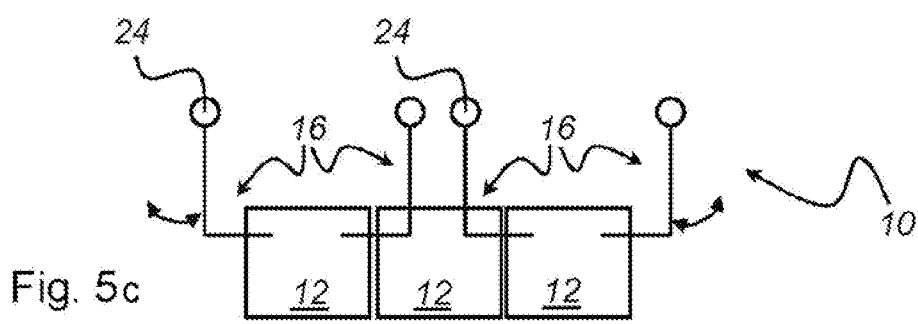

FIGS. 5a to 5e shows various arrangements of grabs 16 that allow gripping and/or engaging cases in a grab apparatus 10. In FIG. 5a the hooks 20 are all directed in the same direction, whereas in FIG. 5b they are subdivided into two groups, here of two each, with the hooks 20 directed toward the center of the three cases 12 to be picked up. In FIG. 5c there are again four grabs 16 arranged in pairs with their fingers 20 directed toward each other.

Figure 5D:
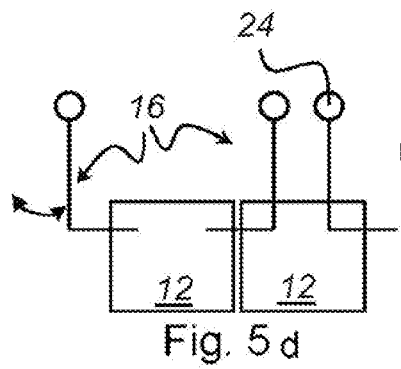
Figure 5E:
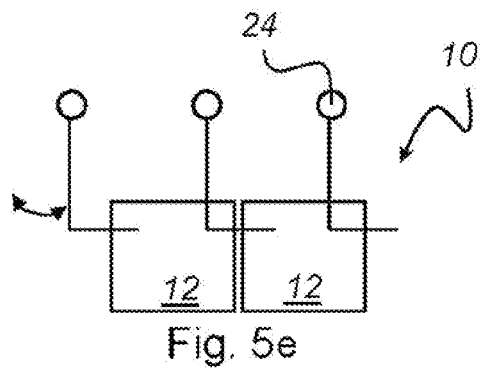

The systems of FIGS. 5d and 5e each have three grabs 18 for lifting two cases 12 with the hooks 20 of the outer grabs 18 projecting one direction while the middle hook 20 projects oppositely, whereas in FIG. 5e they all project in the same direction. In all systems there is one more grab 16 than number of cases 12. The pivoting directions of the arms 18 is shown by the respective double arrows.

The invention is not limited to the above embodiments. Instead, a variety of alternatives and modifications is contemplated that make use of the inventive idea and thus fall within the scope of the invention.

We claim:

1. In an apparatus for grabbing and lifting a case having side walls each formed with a hole, the improvement comprising:
a plurality of grabs each having
a support and
a plurality of generally vertical lift arms each having an upper end independently pivotal in the support about a respective common axis and a lower end provided with a horizontally projecting finger engageable into one of the holes, the fingers of each grab projecting horizontally in the same direction from the respective arm and being vertically offset from one another.

2. The apparatus defined in claim 1 wherein one of the arms has a cutout and another of the arms has a lower end accommodated in the cutout, wherein one of the one and other arms is bent so that its lower end is offset from its upper end.

3. The apparatus defined in claim 2 wherein the lower ends of the one and of the other arm are movable on pivoting of the respective arms in a common plane.

4. The apparatus defined in claim 1 wherein the arms of each grab are of different lengths between the respective common pivot axis and the respective lower ends.

5. The apparatus defined in claim 1 wherein each grab is provided with a horizontal shaft on which the support is fixed and that defines the respective common axis.

6. The apparatus defined in claim 5, further comprising
a drive for pivoting the shaft and the supports for pressing the fingers against one of the sides of the case with at least one of the fingers engaging into the respective hole.

7. The apparatus defined in claim 1 wherein the apparatus has two of the grabs and the fingers of the two grabs are directed toward or away from each other.

8. The apparatus defined in claim 1 wherein the apparatus has two of the grabs and the fingers of the two grabs are aligned or offset from one another.

9. In an apparatus for grabbing and lifting a case having side walls each formed with a hole, the improvement comprising:
a support; and
a plurality of generally vertical grabs each having
a plurality of pivotal lift arms each having an upper end independently pivotal about a respective axis in the support and a lower end provided with a horizontally projecting finger engageable into one of the holes, the fingers of each arm being vertically offset from one another and all projecting horizontally in the same direction from the respective arms, and
respective springs biasing the arms into a position with the fingers vertically one above the other.

10. The apparatus defined in claim 9 wherein each grab is provided with respective means for adjusting the force of the springs.

11. In an apparatus for grabbing and lifting a case having side walls each formed with a hole, the improvement comprising:
a plurality of grabs each having
a support and
a plurality of generally vertical lift arms each having an upper end independently pivotal in the support and a lower end provided with a horizontally projecting finger engageable into one of the holes, the fingers of each grab projecting horizontally in the same direction from the respective arm and being vertically offset from one another, each grab having three such arms with respective fingers.

12. In an apparatus for grabbing and lifting a case having side walls each formed with a hole, the improvement comprising:
a plurality of grabs each having
a support,
a plurality of generally vertical lift arms each having an upper end independently pivotal in the support and a lower end provided with a horizontally projecting finger engageable into one of the holes, the fingers of each grab projecting horizontally in the same direction from the respective arm and being vertically offset from one another, and
a brace arm engageable with an inside face of a respective side of the case.

13. An apparatus for grabbing and lifting a case having side walls each formed with a hole, the apparatus comprising two horizontally spaced grabs each having
a support;
a plurality of lift arms pivotal on the support and each having a lower end provided with a horizontally projecting finger engageable into one of the holes, the fingers of each grab being vertically offset from one another;
springs braced between the support and the arms and biasing the lower ends into outer positions one above the other; and
drive means for pivoting the supports and swinging the fingers against respective sides of the case such that at least one of the fingers engages in the respective hole and at least one of the fingers is deflected back out of the outer position.

14. The apparatus defined in claim 13 wherein each grab has one lift arm with a finger directly above the finger of another of the lift arms of the respective grab, the finger of the other lift arm being cut out to accommodate the finger of the one lift arm.

* * * * *